United States Patent Office
3,644,497
Patented Feb. 22, 1972

3,644,497

CONVERSION OF ETHYLENICALLY UNSATURATED COMPOUNDS USING HETEROPOLYMOLYBDIC AND HETEROPOLYTUNGSTIC ACIDS AS CATALYSTS

Frank G. Mesich, Corpus Christi, Tex., assignor to Celanese Corporation, New York, N.Y.

No Drawing. Filed Nov. 1, 1968, Ser. No. 772,817
Int. Cl. C07c *69/14, 31/10*
U.S. Cl. 260—497 R 17 Claims

ABSTRACT OF THE DISCLOSURE

Process for the conversion of ethylenically unsaturated compounds to esters and alcohols wherein the ethylenically unsaturated compound and a carboxylic acid are reacted in the presence of a free heteropolyacid of molybdenum or tungsten. Esters are the main product when anhydrous conditions are used while a mixture of esters and alcohols may be produced when water is present.

BACKGROUND OF THE INVENTION

The present invention relates to the conversion of ethylenically unsaturated compounds to useful products such as alcohols and carboxylic acid esters.

It has been known for years that esters such as isopropyl acetate and bornyl acetate could be produced by the direct esterification of ethylenically unsaturated compounds with carboxylic acids. However, such one-step processes for esterification have not been used very widely despite various advantages offered by a one-step process which utilizes two or more steps to produce an ester from an ethylenically unsaturated compound and a carboxylic acid, such as for example those two-step processes wherein the ethylenically unsaturated compound is first hydrolyzed to an alcohol and then the alcohol reacted with the carboxylic acid so as to form the ester. The reason for the extensive use of a one-step esterification process has been mainly due to the fact that prior art catalysts for effecting the esterification of ethylenically unsaturated compounds are inefficient. Among the catalysts presently known for the esterification of carboxylic acids with an ethylenically unsaturated compound are boron fluoride, titanium chloride, sulfuric acid, boron fluoride etherate, boron fluoride dihydrate, dihydroxy fluoboric acid, and boron fluoride-hydrogen fluoride.

It has also been known that ethylenically unsaturated compounds can be converted into alcohols by one-step processes wherein the ethylenically unsaturated compound is hydrated in the presence of catalysts such as dilute solutions of sulfuric acid. However, such processes have not been used commercially because of low conversions and yields. As a result new methodss are constantly being sought for the production of alcohols from ethylenically unsaturated compounds in a one-step process.

SUMMARY

It is thus an object of the present invention to provide a novel method for the production of esters and alcohols from ethylenically unsaturated compounds. It is a further object of the present invention to provide a method for the esterification of ethylenically unsaturated compounds with carboxylic acids utilizing an improved catalyst. It is also an object of the present invention to provide an efficient process wherein ethylenically unsaturated compounds may be converted to alcohols in one step. Additional objects will become apparent from the following descripiton of the present invention.

These and other objects are accomplished by the present invention which in one of its embodiments is a process for the production of alcohols and esters which comprises reacting an ethylenically unsaturated compound with a carboxylic acid in the presence of a catalyst which is a free heteropolyacid of molybdenum or tungsten. When the process is operated under substantially anhydrous conditions the principal product will be esters of the ethylenically unsaturated compound and the carboxylic acid; however, when the process is carried out in the presence of water substantial amounts of alcohols corresponding to the ethylenically unsaturated compounds may also be produced.

DESCRIPTION OF THE PREFERRED EMBODIMENTS

As may be seen from the above, the presence invention may be used for producing esters and alcohols depending whether water is present during the reaction. In most cases it has been found that the products formed in the present process are those products expected from Markownikoff's Rule. Thus isopropyl alcohol and/or an isopropyl ester such as isopropyl acetate may be formed from propylene. Likewise octene-1 will generally be converted to octane-2-ol or a 2-hydroxy octyl carboxylate. Ethylene is one notable exception as it is usually converted to butane-2-ol or the corresponding ester.

The ethylenically unsaturated compounds that may be converted in the process of the present invention are in general those compounds that have at least one ethylenic double bond present with ethylenically unsaturated hydrocarbons being the usual starting material. Best results are obtained when converting ethylenically unsaturated hydrocarbons of 2 to 30 carbon atoms which are free of acetylenic unsaturation, especially those non-aromatic hydrocarbons of 3 to 15 carbon atoms which have a single ethylenic double bond as the only unsaturation and which have at least one hydrogen atom connected to a carbon atom adjacent the ethylenic unsaturation, e.g. the alpha-olefins such as isobutylene. Some specific ethylenically unsaturated compounds that may be converted according to the present invention are propylene, butene-1, octene-2, cyclohexene, butadiene, hexene-2, 2-methylbutene-1, cyclooctadiene, styrene, indene, stilbene, 1-vinyl-1-propene, vinyl cyclohexane, decene-2, propylene tetramer, pinene, isobutylene, decene-1, butene-2, allyl alcohol and allyl chloride.

Practically any carboxylic acid may be utilized in the process of the present invention including monocarboxylic acids, dicarboxylic acids, tricarboxylic acids, etc. These carboxylic acids may be aromatic or non-aromatic, unsubstituted or substituted with various substituents such as halo, hydroxyl, nitro, amino, sulfo, carbonyl, or alkoxy substituents. Some specific carboxylic acids that may be utilized are formic, acetic, propionic, valeric, terephthalic, tetrachlorterephthalic, chloroacetic, adipic, succinic, butyric, acrylic, isophthalic, methacrylic, monomethyl terephthalic, crotonic, caproic, n-undecyclic, sorbic, palmitic, stearic, oleic, cis-erucic, oxalic, azelaic, maleic, glycolic, malic, levulinic, abietic, benzoic, nitrobenzoic, phenylacetic, picolinic, and furoic. The preferred carboxylic acids for use in the present process are those of 1 to 20 carbon atoms, being free of ethylenic and acetylenic unsaturation and being of the formula $$R_1\text{—COOH}$$

wherein $R_1$ is a hydrocarbon or carboxyl-substituted hydrocarbon radical, with the aliphatic carboxylic acids such as formic and succinic being especially preferred. When carrying out the process in the presence of water so as to produce alcohols, it is preferred that the boiling point of the acid and of the esters produced be substantially above the boiling points of the alcohol product and the ethylenically unsaturated compound starting material so as to ease separation of the products. The amount of carboxylic acid which is required in the present process may vary over wide ranges but generally the carboxylic acid should be present in amounts so as to provide from about 0.05 to 100, and preferably 0.8 to 10.0 equivalents per mole of ethylenically unsaturated compound.

The operating conditions for carrying out the present process may vary widely but the temperature should generally be between about 0 and 200° C. The pressure should be enough to maintain a liquid phase in the reaction zone and may vary from subatmospheric pressures to 5000 p.s.i.g. When operating under essentially anhydrous conditions so that esters are the main product, the temperature is preferably between about 20 and 140° C. while the pressure is between about 0 and 3000. Usually slightly more severe conditions are required when operating in the presence of water so as to produce alcohols than when operating under anhydrous conditions. Thus the preferred temperature range when operating with substantial amounts of water present is from about 50 to 175° C. with the pressure preferably being from about 0 to 4000 p.s.i.g.

In performing the present process so that alcohols may be recovered, the amount of water necessary may vary according to the desired amount of alcohols to be produced since the product will generally be an almost equilibrium mixture of alcohols and esters. Generally the water should be present in amounts of from 1 to 75 moles per mole of ethylenically unsaturated compound. Although applicant does not wish to be bound by any theory it appears that the alcohols present in the reaction product result from the hydrolysis of esters. That is to say it appears that the ethylenically unsaturated compound first undergoes an esterification reaction with the carboxylic acid and then the ester is hydrolyzed to give the alcohol. This theory is supported by the fact that higher temperatures are generally required when it is desired to produce alcohols. At least a part of the alcohol may be produced by the direct hydration of the ethylenically unsaturated compound. At any rate it has been found that when it is desired to produce alcohols, the presence of a catalyst for the hydrolysis of esters is very beneficial. Various catalysts for the hydrolysis of carboxylic acid esters are well known such as phosphoric acid, benzene sulfonic acid, and sulfuric acid. Of the hydrolysis catalysts that may be utilized in the present process, sulfuric acid is preferred. When using a hydrolysis catalyst it is preferably present in amounts of from about 0.1 to 10 wt. percent based on the total amount of liquid present.

The free heteropolymolybdic or heteropolytungstic acids which are required as catalysts in the present process are well known types of compounds each member of which contains a number of replaceable hydrogen ions as well as a complex and high weight anion. These free acids are generally very water soluble and in crystalline form are almost always highly hydrated. The heteropolyanions of these free acids contain various numbers of molybdenum or tungsten ions around a central atom, sometimes referred to as a heteroatom. In some instances a portion of the molybdenum or tungsten ions are replaced by pentavalent vanadium or niobium. The ratio of the number of tungsten or molybdenum atoms to the central atoms may vary widely but will generally be between 6:1 and 12:1 with especially good results being obtained with those wherein the ratio is 9:1 to 11:1. As many as 36 different elements have been reported to function as central ions, however, in general the catalyst of the present invention will contain central ions which are of phosphorus, arsenic, silicon, germanium, titanium, cobalt, iron, aluminum, chromium, zirconium, gallium, tellurium, and boron. The free heteropolymolybdic and heteropolytungstic acids are generally named so as to indicate both the ratio of molybdenum or tungsten to the central atom as well as what the central atom is composed of. Thus $H_3[PMo_{12}O_{40}]\cdot 59H_2O$ named 12-molybdophosphoric acid and $H_6[P_2Mo_{20}O_{68}]\cdot 48H_2O$ is 10-molybdophosphoric acid. Other free heteropolyacids of molybdenum or tungsten useful as catalysts in the present invention are dimeric 9-molydophosphoric acid, $H_6[P_2Mo_{18}O_{62}]\cdot xH_2O$; dimeric 9-tungstophosphoric acid, $H_6[P_2W_{12}O_{62}]\cdot xH_2O$; 12-tungstotelluric acid $$H_4[TeW_{12}O_{40}]\cdot 25H_2O$$

11-tungstoaluminic acid, $H_{10}[Al_2W_{22}O_{74}]\cdot 44H_2O$; vanadotungstoselenic acid, $H_6SeO_2\cdot 10WO_3\cdot V_2O_5\cdot xH_2O$; dimeric 9-molybdoarsenic acid, $H_6[As_2MO_{18}O_{62}]\cdot xH_2O$; 9-molybdomanganic acid, $H_6[MnMo_9O_{32}]\cdot xH_2O$; 12-tungstosilicic acid, $H_4[SiW_{12}O_{40}]\cdot xH_2O$; 12-molybdosilicic acid, $$H_4[SiMo_{12}O_{40}]\cdot xH_2O$$

Since the heteropolyanions of the catalysts of the present process are generally decomposed by strongly basic solutions the process should generally be conducted such that the pH remains below about 9.0, preferably below 7.0. The catalytic amount of the heteropolyacid used will generally be between about $10^{-5}$ to $10^{-1}$ moles, preferably $10^{-4}$ to $10^{-2}$ moles of the free heteropolyacid per mole of the ethylenically unsaturated compound being converted. As mentioned above the preferred catalysts of the present invention are those free acids wherein the ratio of molybdenum or tungsten to the element comprising the central atom is 9:1 to 11:1. In these preferred heteropolyacids, the central atom is generally phosphorus, arsenic, or manganese in the heteropolymolybdic acids. In these preferred heteropolytungstic acids those having silicon as a central atom are preferred. 10-Molybdophosphoric acid is the preferred catalyst for use in the present invention.

The present process may be carried out either continuously, intermittently or batchwise and the reactants may be added in any order. Stirring the reactants or other forms of agitation is not necessary but reduces the time required to complete the reaction by promoting intimate contact of the reactants. Inert solvents may be utilized if desired but are not generally necessary.

EXAMPLE I

A stirred one-liter Parr bomb was charged with about 100 milliliters water, 118 grams succinic acid, and 2 grams of 10-molybdophosphoric acid and then the contents of the bomb were cooled to about −75° C. by immersing the bomb in a Dry Ice-acetone bath. About 84 grams of propylene which had been liquified by cooling it in a Dry Ice-acetone bath was then added to the Parr bomb and the bomb was sealed. The bomb was heated to 160° C. for 120 minutes and then rapidly cooled to ambient temperature by immersing the bomb in an ice water bath. The propylene remaining was slowly bled off and the remaining contents of the bomb analyzed by gas chromatography. Analysis showed that about 10% of the propylene charged had been converted to isopropyl alcohol.

EXAMPLE II

The procedure of Example I was repeated except that the charge consisted of about 100 milliliters water, 50 grams succinic acid, 2 grams 10-molybdophosphoric acid, 84 grams of propylene, and 5 milliliters of sulfuric acid. Also in this experiment the temperature was maintained at 140° C. for two hours. Analysis showed that about 40% of the propylene charged had been converted to isopropyl alcohol.

EXAMPLE III

The procedure of Example I was repeated except that the charge consisted of 100 milliliters butyric acid, 70 grams of propylene, and 1 gram of 10-molybdophosphoric acid. In this run the temperature was maintained at 120° C. for one hour. Analysis of the reaction product showed that about 90% of the propylene had been converted to isopropyl butyrate.

EXAMPLE IV

The procedure of Example I was repeated except that the charge consisted of about 200 milliliters of acetic acid, 70 grams of propylene, and 2 grams of 12-tungstophosphoric acid. Also in this experiment the temperature was maintained at 120° C. for two hours. Analysis of the reactor product showed that about 5% of the propylene had been converted to isopropyl acetate.

EXAMPLE V

The procedure of Example I was repeated except that the charge consisted of 200 grams acetic acid, 72 grams propylene, and 0.54 gram of 10-molybdophosphoric acid. In this run the temperature was maintained at 125° C. for one hour. Analysis of the reactor product showed that about 88.8% of the propylene had been converted and of the propylene converted. 100% was converted to isopropyl acetate.

EXAMPLE VI

The procedure of Example I was repeated except that the charge consisted of about 156 grams of acetic acid, 49 grams of water, 80 grams of propylene and 0.57 gram of 10-molydophosphoric acid. The temperature in this run was maintained at 160° C. for three hours. Analysis of the reactor product showed that about 65% of the propylene had been converted and of the propylene which had been converted about 66.9% went to isopropyl acetate and 33.1% went to isopropyl alcohol.

EXAMPLE VII

The procedure of Example I was repeated except that the charge consisted of about 240 grams of formic acid, 110 grams of propylene, and 3.5 grams of 10-molybdophosphoric acid. In this run the temperature was maintained at 100° C. for 18 minutes. Analysis of the reactor product showed that about 85% of the propylene charged had been converted, with 100% of the propylene converted going to isopropyl formate.

EXAMPLE VIII

The procedure of Example I was repeated except that the charge consisted of about 175 grams formic acid, 23 grams of water, 97 grams of propylene, and 3 grams of 10-molybdophosphoric acid. In this run the temperature was maintained at 165° C. for 2 hours. Analysis of the reactor product showed that about 82.6% of the propylene charged had been converted with about 94.2% of that propylene which had been converted going to isopropyl formate and 5.8% of the propylene which had been converted going to isopropyl alcohol.

EXAMPLE IX

The procedure of Example I was repeated except that the charge consisted of about 23 grams of formic acid, 180 grams of water, 72 grams of propylene, and 2.8 grams of 10-molybdophosphoric acid. In this run the temperature was maintained at 210° C. for about 2 hours. Analysis of the reactor product showed that about 26.5% of the propylene charged had been converted with about 6.8% of that propylene converted going to isopropyl formate nad 93.2% of that propylene converted going to isopropyl alcohol.

EXAMPLE X

About 25 milliliters of cyclohexene, 25 milliliters of acetic acid, and 0.5 gram of 10-molydophosphoric acid were put in a pressure bottle at room temperature and the bottle sealed. The pressure bottle was then immersed in a constant temperature bath at 100° C. for 1 hour and then cooled to room temperature. Gas chromatography analysis of the contents of the pressure bottle showed that about 34% of the cyclohexene charged had been converted to cyclohexyl acetate.

EXAMPLE XI

The experiment of Example X was repeated using 9-molybdophosphoric acid and practically identical results were obtained.

EXAMPLE XII

About 50 milliliters of acetic acid containing 0.25 gram of 10-molybdophosphoric acid were put in a flask and then isobutylene was bubbled into the flask at room temperature, about 25° C. After one hour the temperature in the flask had risen to about 35° C. and the liquid in the flask contained 48 wt. percent of t-butyl acetate. Of the isobutylene converted, 85+% had been converted to t-butyl acetate.

EXAMPLE XIII

A three-neck, 12-liter flask was fitted with a reflux condenser and a mechanical stirrer. Then the following were added to the flask: 35 grams 10-molybdophosphoric acid, 1400 grams decene-1, and 4200 grams acetic acid. The mixture was refluxed for 16 hours and upon distillation the following four cuts were made: (1) 75 grams of a mixture of acetic acid, water and decene-1, (2) 450 grams unreacted decene-1, (3) 60 grams of a mixture of decene and decyl acetate, and (4) 900 grams of 2-decyl acetate of 98+% purity.

The embodiments of the invention in which an exclusive property or privilege is claimed are defined as follows:

1. A process for the production of a product comprising an ester derivative of an ethylenically unsaturated hydrocarbon of two to about thirty carbon atoms which is free of acetylenic unsaturation, which process comprises reacting said ethylenically unsaturated compound and a carboxylic acid of one to twenty carbon atoms which is free of ethylenic and acetylenic unsaturation and is of the formula $R_1$—COOH wherein $R_1$ is a hydrocarbon or carboxyl-substituted hydrocarbon radical, at a temperature between about 0° C. and 200° C., in the presence of a liquid phase comprising a member of the group consisting of said carboxylic acid and mixtures of said carboxylic acid with water and containing a catalyst which is a free heteropolymolybdic or heteropolytungstic acid having a central atom of manganese, phosphorus, arsenic, silicon, germanium, titanium, cobalt, iron, aluminum, chromium, zirconium, gallium, tellurium, or boron.

2. The process of claim 1 wherein said liquid phase is substantially anhydrous and the product comprises predominantly said ester derivative.

3. The process of claim 2 wherein said catalyst is a heteropolymolybdic acid having a central atom of phosphorus, manganese or arsenic and wherein the ratio of molybdenum atoms to central atoms is from about 9:1 to 11:1.

4. The process of claim 2 wherein said catalyst is 10-molybdophosphoric acid.

5. The process of claim 3 wherein said ethylenically unsaturated compound is an on-aromatic hydrocarbon of 3–20 carbon atoms having a single ethylenic double bond as the only unsaturation and which has at least one hydrogen atom attached to a carbon atom adjacent to the ethylenic unsaturation.

6. The process of claim 5 wherein said carboxylic acid is an aliphatic carboxylic acid.

7. The process of claim 6 wherein said carboxylic acid is present in amounts so as to provide from about 0.8 to 10 equivalents of acid per mole of ethylenically unsaturated compound.

8. The process of claim 7 wherein the catalyst is present in amounts of from about $10^{-4}$ to $10^{-2}$ moles per mole of ethylenically unsaturated compound.

9. The process of claim 2 wherein said ethylenically unsaturated compound is isobutylene, wherein said catalyst is 10-molybdophosphoric acid, wherein said carboxylic acid is acetic, wherein the pressure is sufficient to maintain a liquid phase and wherein the temperature is from about 20 to 140° C., the acetic acid being present in amounts of from 0.8 to 10 equivalents per mole of isobutylene and the catalyst being present in amounts of from about $10^{-5}$ to $10^{-1}$ moles per mole of isobutylene.

10. The process of claim 1 wherein said liquid phase comprises water and said carboxylic acid in amounts so as to provide from 0.05 to 100 equivalents of acid per mole of ethylenically unsaturated compound, and wherein the product comprises the alcohol corresponding to said ester.

11. The process of claim 10 wherein said ethylenically unsaturated compound is a non-aromatic hydrocarbon of 3–20 carbon atoms having a single ethylenic double bond as the only unsaturation and which has at least one hydrogen atom connected to a carbon atom adjacent to ethylenic unsaturation.

12. The process of claim 11 wherein said carboxylic acid is an aliphatic carboxylic acid which is present in amounts so as to provide from about 0.8 to 10 equivalents of acid per mole of ethylenically unsaturated compound.

13. The process of claim 12 wherein said catalyst is a heteropolymolybdic acid having a central atom of phosphorus, manganese or arsenic and wherein the ratio of molybdenum atoms to central atoms is from about 9:1 to 11:1.

14. The process of claim 12 wherein said catalyst is 10-molydophosphoric acid.

15. The process of claim 13 wherein a sulfuric acid hydrolysis catalyst is present.

16. The process of claim 14 wherein a sulfuric acid hydrolysis catalyst is present.

17. The process of claim 16 wherein said carboxylic acid is formic acid, wherein said ethylenically unsaturated compound is propylene, wherein the water is present in amounts of from about 1 to 75 moles per mole of propylene, and wherein the temperature is from about 50 to 175° C.

References Cited

UNITED STATES PATENTS

| | | | |
|---|---|---|---|
| 3,299,110 | 1/1967 | Pine | 260—410.9 |
| 3,088,969 | 5/1963 | Callahan et al. | 260—641 |

FOREIGN PATENTS

| | | | |
|---|---|---|---|
| 1,128,428 | 4/1962 | Germany | 260—497 |
| 1,151,498 | 7/1963 | Germany | 260—497 |

LORRAINE A. WEINBERGER, Primary Examiner
R. D. KELLY, Assistant Examiner

U.S. Cl. X.R.

260—487, 488 F, 491, 617 R, 618 R, 631 R, 635 R, 638 R, 641; 252—432, 437, 467, 469, 470; 260—294.3 R, 347.5, 410, 410.9 R, 468, 471 R, 475 R, 476 R, 484 R, 486 R

PO-1050
(5/69)

UNITED STATES PATENT OFFICE
CERTIFICATE OF CORRECTION

Patent No. 3,644,497 Dated February 22, 1972

Inventor(s) Frank G. Mesich

It is certified that error appears in the above-identified patent and that said Letters Patent are hereby corrected as shown below:

Column 1, line 34, immediately preceding "which utilizes two", insert -- over a process --.

Claim 5, line 2 thereof, in place of "an on-aromatic" read -- a non-aromatic --.

Signed and sealed this 27th day of June 1972.

(SEAL)
Attest:

EDWARD M.FLETCHER,JR.
Attesting Officer

ROBERT GOTTSCHALK
Commissioner of Patents